United States Patent [19]

Favata

[11] 4,176,102

[45] Nov. 27, 1979

[54] SEALANT COMPOSITION

[76] Inventor: Theodore Favata, 3196 Ramona St., Pinole, Calif. 94564

[21] Appl. No.: 947,957

[22] Filed: Oct. 2, 1978

[51] Int. Cl.² .............................................. C08L 91/00
[52] U.S. Cl. :.......................... 260/28.5 AS; 260/17 R; 260/28.5 AV; 424/167
[58] Field of Search ..... 260/28.5 AS, 17 R, 28.5 AV; 424/167

[56] References Cited

U.S. PATENT DOCUMENTS

| | | | |
|---|---|---|---|
| 3,629,164 | 12/1971 | Smith et al. | 260/28.5 AS |
| 3,951,895 | 4/1976 | Anthenien et al. | 260/28.5 AS |
| 3,985,694 | 10/1976 | Petrucco et al. | 260/28.5 AV |
| 4,105,612 | 8/1978 | Cushman et al. | 260/28.5 AV |

*Primary Examiner*—Melvyn I. Marquis

[57] ABSTRACT

A novel sealant composition is disclosed which comprises approximately 50 to 80 parts by volume of an asphaltic emulsion, approximately 20 to 50 parts by volume of a copolymer prepared by the copolymerization of a vinyl acetate monomer with an organic acid and approximately 0.5 to 2.0 parts by volume of nonionic surfactant having a hydrolyptic balance from approximately 11 to 14. The sealant composition is adapted to seal asphalt, cement, roofs and metal, among other things.

16 Claims, No Drawings

SEALANT COMPOSITION

BACKGROUND OF THE INVENTION

Various attempts have been made to prepare sealant compositions for asphalt and other materials. It has been found that unsealed asphalt becomes porous through use and allows water to seep through the asphaltic particles, causing ground swells which result in cracking of the asphalt surface.

It has been attempted in the past to combine asphaltic materials with copolymers in order to produce sealing compounds. For example, U.S. Pat.No. 3,629,164 teaches the combination of propane-precipitated asphalt with an ethylene-lower alkyl acrylate copolymer. This patent teaches that the mixing occurs at elevated temperatures using the specific propane-precipitated asphalt.

A second attempt to produce such a composition was U.S. Pat. No. 3,951,895. In this latter patent, an asphaltic emulsion was mixed with an emulsion of a copolymer of methyl methacrylate and ethyl acrylate. Although this latter composition proved to be superior to various sealant compositions known at the time, it was found that the methyl methacrylate-ethyl acrylate copolymer was not entirely compatible with commercially available asphaltic emulsions, which resulted in separation and gelling of the composition. It was also found that the methyl methacrylate-ethyl acrylate copolymer did not possess sufficient mechanical stability, which resulted in breakdown during vigorous mixing operations.

SUMMARY OF THE INVENTION

It is thus an object of the present invention to produce an improved sealant composition.

It is a further object of the present invention to produce a sealant composition which possesses improved mechanical stability over sealant compositions of the prior art.

It is further object of the present invention to produce a sealant composition wherein a copolymer is employed which is more compatible with asphaltic emulsions than those employed in the prior art.

It is yet another object of the present invention to produce a universal sealant composition which seals not only asphalt but also roofs, concrete and metal.

It has been found that an improved sealant composition could be prepared by combining approximately 50 to 80 parts by volume of an asphaltic emulsion with approximately 20 to 50 parts by volume of a copolymer prepared by the copolymerization of a vinyl acetate monomer with an organic acid and approximately 0.5 to 2.0 parts by volume of a nonionic surfactant having a hydrolyptic balance from approximately 11 to 14.

The asphaltic emulsion can be any well known commercially available material such as SS1h emulsion, which is a slow set, grade 1, hard grade (60-70) base asphalt, with a penetration of about 100.

The copolymer is prepared by the copolymerization of a vinyl acetate monomer with an organic acid. Preferred organic acids are acrylic acid and maleic acid. The vinyl acetate monomer can be one of many commercially available materials. Examples of commercially available copolymers of vinyl acetate monomers and acrylic acid are 40-133 from Reichold Chemicals, Inc.; 3011 from Union Oil Company of California; 3077 from Union Oil Company of California; 928 from McCloskey Varnish Company; 425 from Air Products and Chemical Company; 40-136 from Reichold Chemicals, Inc.; 40-134 from Reichold Chemicals, Inc.; and 2023 from Union Oil Company of California. A commercially available copolymer of vinyl acetate and maleic acid is 3047-3 from the McCloskey Varnish Company. Thus, it can be seen that the copolymers useful in practicing the present invention are readily available from various chemicl companies and represent well known vinyl acetate copolymers.

Any nonionic surfactant may be used which has a hydrolyptic balance between 11 and 14. It was found that an acceptable nonionic surfactant was an alkylphenoxypoly(ethyleneoxy)-ethanol, which is known as IGEPAL CTA-639 from the General Alkaline & Film Corporation. This is a water soluble nonionic surfactant commonly used for emulsion paints.

It was found that in using the claimed sealant composition that the pH of the composition should be kept between approximately 6.7 to 8.9 with a preferred range between approximately 7.5 to 8.4. It was also found that when preparing sealant compositions for asphalt, concrete and metal that the viscosity of the composition should be kept between 57 to 67 K.U. However, when the sealant is used for roofs, the viscosity was kept between approximately 72 to 98 K.U. As a means of increasing the viscosity, a filler was added to the sealant composition when used on roofs. A preferred filler was found to be bentonite clay.

Other optional ingredients are also employed in order to make an improved sealant composition. For example, it was found that a thickener could be used which could be, for example, hydroxyethylcellulose. In order to keep the pH in the range recited above, a buffer could also be used in the composition. An acceptable buffer is ammonium hydroxide. A coalescent could also be used, and it was found that butyl carbitol acetate performed adequately. If the sealant is to be stored for long periods of time, it has also been found useful to employ a fungicide in the composition.

EXAMPLE

A mixing vessel is charged with 10 parts by volume water and to it is added 0.5 parts by volume hydroxyethylcellulose and 1 part by volume alkylphenoxypoly(ethyleneoxy)ethanol. These constituents are mixed for approximately five minutes or until a smooth gel structure is formed. Once formed, the gel is charged into a large blending tank and is mixed with approximately 75 parts by volume SS1h asphaltic emulsion. These constituents are mixed slowly to avoid air entrapment and to the mixture is added 25 parts by volume of the copolymer of vinyl acetate-acrylic acid. If air entrapment occurs, 0.1-0.2 parts by volume of a silicone-free defoamer can be employed. If desirable, 0.1-0.2 parts by volume of a fungicide can then be added together with 0.2-1.0 parts by volume of a coalescent, such as butyl carbitol acetate.

The mixture can then be tested for pH and the pH brought to between 6.7 to 8.9 by the use of from approximately 0.1-0.2 parts by volume of buffer, such as ammonium hydroxide. In this example, 0.125 parts by volume of ammonium hydroxide was added. The solution is then tested for viscosity and the viscosity is adjusted to between 57 to 67 K.U. by the addition of water.

The composition referred to above can be used to coat asphaltic surfaces as well as cement and metal without further alteration. If it is desired to use the composition to seal roofs, approximately up to 5 pounds per gallon of a filler, such as bentonite clay, is employed, resulting in a viscosity between approximately 72 to 98 K.U. The resulting composition can be applied to surfaces at ambient air temperatures without prior surface treatment. When coated on an asphaltic surface, the surface is completely dry within two hours producing a durable, water-resistant surface which maintains its flexibility over long periods of time.

What is claimed is:

1. A sealant composition comprising:
   A. approximately 50 to 80 parts by volume asphaltic emulsion;
   B. approximately 20 to 50 parts by volume of a copolymer prepared by the copolymerization of a vinyl acetate monomer with an organic acid; and
   C. approximately 0.5 to 2.0 parts by volume of a nonionic surfactant having a hydrolyptic balance from approximately 11 to 14.

2. The sealant composition of claim 1 wherein said organic acid is acrylic acid.

3. The sealant composition of claim 1 wherein said organic acid is maleic acid.

4. The sealant composition of claim 1 wherein the pH of the composition is between approximately 6.7 to 8.9.

5. The sealant composition of claim 1 wherein the pH of the composition is between approximately 7.5 to 8.4.

6. The sealant composition of claim 1 further comprising a filler.

7. The sealant composition of claim 6 wherein the filler is bentonite clay.

8. The sealant composition of claim 1 wherein the viscosity of the composition is between approximately 57 to 67 K.U.

9. The sealant composition of claims 6 or 7 wherein the viscosity of the composition is between approximately 72 to 98 K.U.

10. The sealant composition of claim 1 wherein the nonionic surfactant is an alkylphenoxypoly(ethyleneoxy)ethanol.

11. A sealant composition comprising:
    A. approximately 75 parts by volume asphaltic emulsion;
    B. approximately 25 parts by volume of a copolymer prepared by the copolymerization of a vinyl acetate monomer with an organic acid;
    C. approximately 1.0 part by volume of a nonionic surfactant having a hydrolyptic balance from approximately 11 to 14;
    D. approximately 0.5 parts by volume thickener;
    E. approximately 0.1–0.2 parts by volume of a buffer;
    F. approximately 0.2–1.0 parts by volume of a coalescent;
    G. approximately 0.1–0.2 parts by volume of a silicone-free defoamer; and
    H. sufficient water to adjust the viscosity to between approximately 57 to 67 K.U.

12. The sealant composition of claim 11 further comprising approximately 0.1 to 0.2 parts by volume of a fungicide.

13. The sealant composition of claim 11 further comprising approximately up to 5 pounds per gallon of a filler.

14. The sealant composition of claim 11 wherein said thickener is hydroxyethylcellulose.

15. The sealant composition of claim 11 wherein said buffer is ammonium hydroxide.

16. The sealant composition of claim 11 wherein said coalescent is butyl carbitol acetate.

* * * * *